United States Patent
Rose et al.

(10) Patent No.: US 9,143,509 B2
(45) Date of Patent: Sep. 22, 2015

(54) GRANULAR ASSESSMENT OF DEVICE STATE

(75) Inventors: Daniel Rose, Modi'in (IL); Amos Ortal, Kfar Yona (IL); Boaz Feldbaum, Haifa (IL); Avihai Dgany, Haifa (IL); Elan Levy, Tel Aviv (IL); Raanan Zvi, Kiryat Bialik (IL); Yoav Yassour, Zikhron Ya'akov (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 13/111,968

(22) Filed: May 20, 2011

(65) Prior Publication Data

US 2012/0297456 A1  Nov. 22, 2012

(51) Int. Cl.
*H04L 29/06*   (2006.01)
*G06F 21/74*   (2013.01)
*G06F 21/50*   (2013.01)

(52) U.S. Cl.
CPC ............ *H04L 63/0876* (2013.01); *G06F 21/74* (2013.01); *H04L 63/0807* (2013.01); *H04L 63/10* (2013.01); *G06F 21/50* (2013.01); *G06F 2221/2105* (2013.01); *G06F 2221/2129* (2013.01)

(58) Field of Classification Search
CPC ..... H04L 63/08; H04L 63/0807; H04L 63/10; H04L 63/0876; G06F 21/30; G06F 21/50; G06F 21/74; G06F 2221/2105; G06F 2221/2129
USPC ............... 726/4, 5, 9; 713/155, 159, 168, 172
See application file for complete search history.

(56) References Cited

U.S. PATENT DOCUMENTS

| | | | | |
|---|---|---|---|---|
| 5,809,230 | A * | 9/1998 | Pereira ............................ | 726/35 |
| 6,490,255 | B1 * | 12/2002 | Kiriha et al. .................. | 370/254 |
| 7,409,710 | B1 * | 8/2008 | Uchil et al. ..................... | 726/19 |
| 7,428,641 | B2 * | 9/2008 | Allen ............................ | 713/182 |
| 7,592,906 | B1 | 9/2009 | Hanna et al. | |
| 7,665,119 | B2 | 2/2010 | Bezilla et al. | |
| 7,832,008 | B1 | 11/2010 | Kraemer | |
| 8,498,957 | B2 * | 7/2013 | Faynberg et al. ............... | 706/52 |

(Continued)

OTHER PUBLICATIONS

"Securing your endpoints for network access with McAfee Policy Enforcer", Retrieved at <<https://images01.insight.com/media/pdf/6-sps-pe-endpt-001-0206p-1.pdf>>, Feb. 2006, p. 1-10.

(Continued)

*Primary Examiner* — Sarah Su
(74) *Attorney, Agent, or Firm* — Timothy Churna; Kate Drakos; Micky Minhas (57) ABSTRACT

A system for assessing a computer device's state may collect state data about the device, then assess the state with respect to the policy for granting one or more claims. Each claim may be defined by a set of requirements that, if fulfilled, may be used to permit or deny access to a resource, such as an application, network, data, or other resource. A collection engine may reside on the device or other location and may collect requested data, and some collection engines may be extensible with a plugin architecture for expansion. A server may receive information from the device to evaluate claims. Depending on the use scenario, the claim results may be incorporated into communications and passed to an evaluator that may produce an access token which is used to permit or deny access based on the claim results.

20 Claims, 5 Drawing Sheets

(56) References Cited

U.S. PATENT DOCUMENTS

| | | | | |
|---|---|---|---|---|
| 2002/0095568 A1* | 7/2002 | Norris et al. | | 713/151 |
| 2002/0147509 A1* | 10/2002 | Sameshima et al. | | 700/32 |
| 2005/0044409 A1* | 2/2005 | Betz et al. | | 713/201 |
| 2006/0026671 A1* | 2/2006 | Potter et al. | | 726/7 |
| 2006/0104486 A1* | 5/2006 | Le Saint et al. | | 382/115 |
| 2006/0200856 A1* | 9/2006 | Salowey et al. | | 726/5 |
| 2006/0203815 A1* | 9/2006 | Couillard | | 370/389 |
| 2007/0006289 A1* | 1/2007 | Limont et al. | | 726/6 |
| 2008/0115208 A1* | 5/2008 | Lee | | 726/19 |
| 2009/0193151 A1* | 7/2009 | Adams et al. | | 710/5 |
| 2009/0240823 A1* | 9/2009 | Rider et al. | | 709/229 |
| 2010/0023755 A1* | 1/2010 | Kotani et al. | | 713/156 |
| 2010/0063855 A1 | 3/2010 | Nguyen | | |
| 2010/0192196 A1 | 7/2010 | Lee | | |
| 2010/0262815 A1* | 10/2010 | Bozek et al. | | 713/1 |
| 2011/0029766 A1* | 2/2011 | Sever et al. | | 713/2 |
| 2011/0030045 A1* | 2/2011 | Beauregard et al. | | 726/9 |
| 2011/0088079 A1* | 4/2011 | Kao | | 726/4 |
| 2011/0179477 A1* | 7/2011 | Starnes et al. | | 726/9 |
| 2011/0302568 A1* | 12/2011 | Bacastow | | 717/168 |
| 2011/0321152 A1* | 12/2011 | Tor et al. | | 726/12 |
| 2012/0054841 A1* | 3/2012 | Schultz et al. | | 726/6 |
| 2012/0110318 A1* | 5/2012 | Stone | | 713/150 |
| 2012/0110651 A1* | 5/2012 | Van Biljon et al. | | 726/4 |
| 2012/0166518 A1* | 6/2012 | Alev et al. | | 709/203 |
| 2012/0204020 A1* | 8/2012 | Novak et al. | | 713/2 |
| 2012/0303827 A1* | 11/2012 | Neystadt et al. | | 709/229 |
| 2013/0036462 A1* | 2/2013 | Krishnamurthi | | 726/19 |
| 2013/0227651 A1* | 8/2013 | Schultz et al. | | 726/4 |
| 2014/0059675 A1* | 2/2014 | Batie et al. | | 726/19 |
| 2014/0128025 A1* | 5/2014 | Raleigh | | 455/406 |

OTHER PUBLICATIONS

"Network Access Protection", Retrieved at <<http://www.microsoft.com/windowsserver2008/en/us/nap-details.aspx>>, Retrieved Date: Jan. 4, 2011, pp. 3.

"NAP Server-side Architecture", Retrieved at <<http://msdn.microsoft.com/en-us/library/cc895519%28VS.85%29.aspx>>, Retrieved Date: Jan. 4, 2011, pp. 5.

* cited by examiner

GRANULAR ASSESSMENT OF DEVICE STATE

BACKGROUND

Assessing a computer's configuration and state may be useful to help determine whether or not a device may be permitted to perform a task, for assessing the health or compliance of the computer, or other use scenarios.

The usefulness of the configuration or state information may be proportional to the granularity or preciseness of the information. Some situations may call for more details, while other situations may call for different information.

SUMMARY

A system for assessing a computer device's state may collect state data about the device, then assess the state with respect to the policy for one or more claims. Each claim may define a set of requirements that, if fulfilled, may be used to permit or deny access to a resource, such as an application, network, data, or other resource. A collection engine may reside on the device or on a server (or both) to collect requested data. Collection engines may be extensible with a plugin architecture for expansion. A server may receive information from the device to evaluate claims. Depending on the use scenario, the claim results may be incorporated into communications and passed to an evaluator that may permit or deny access based on the claim results or used to generate compliance reports for the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A system for assessing a computer device's state may gather and evaluate values for various state objects that are defined in a claim. The claim may be used by a resource as a condition for permitting or denying access to the resource. After gathering the state of the device, a server may process the state information along with some authentication information to generate assessments of the claim that can be considered with higher confidence to be trustworthy. A token may then be generated that may be passed to the resource thereby permitting access to the resource.

The state objects may be any condition, value, configuration item, or any other object that may be detectable relating to the device. In some cases, queries may be made directly to an object, such as a registry setting, configuration file, executing process, or other objects that may reside on and operate within the device. In other cases, queries may be made to a database that may have configuration or other information about the device.

The server may verify the integrity of the client's configuration. In some embodiments, the server may determine that the client is executing legitimate and signed data collection code to minimize any chance that a virus or other malware may impersonate the device or portions of the device. In some embodiments, such detection may be made by comparing signatures or identifiers of operating system or applications executing on the device, or by some other mechanism.

After gathering device state information and verifying the authenticity of the device and the data received from the device, a token may be created that includes the information relating to a claim. The token may be passed to the requested resource and the device may then be granted access to the resource.

The resource may be any type of computing resource, such as data in a database, access to a network, permissions to interact with an application, or some other resource. In some embodiments, the resource may request that a resource provide a claim in order to grant access. If the claim is not fulfilled, or partially fulfilled, the resource may deny access or grant limited access in some embodiments.

One other use scenario may be for compliance reporting. The system may be able to assess and verify a computer device's state, which may be used by auditing systems, license management systems, or other systems that may consume device state information.

Throughout this specification and claims, the term "state object" is used to denote any item that may reflect a device's state, configuration, or condition. The state object may be queried, examined, observed, tested, or otherwise used as a source of a state object value. The state object value may reflect the actual configuration of the device. The state object may be, for example, a registry setting, configuration file, parameter associated with a hardware component, setting for an application, current value of a specific data field, reading from an instrument or peripheral, or any other container for information. In some cases, the state object value may be binary, such as indicating that a condition is true or not, as well as numerical, textual, or may be defined with a complex data type.

Throughout this specification, like reference numbers signify the same elements throughout the description of the figures.

When elements are referred to as being "connected" or "coupled," the elements can be directly connected or coupled together, or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
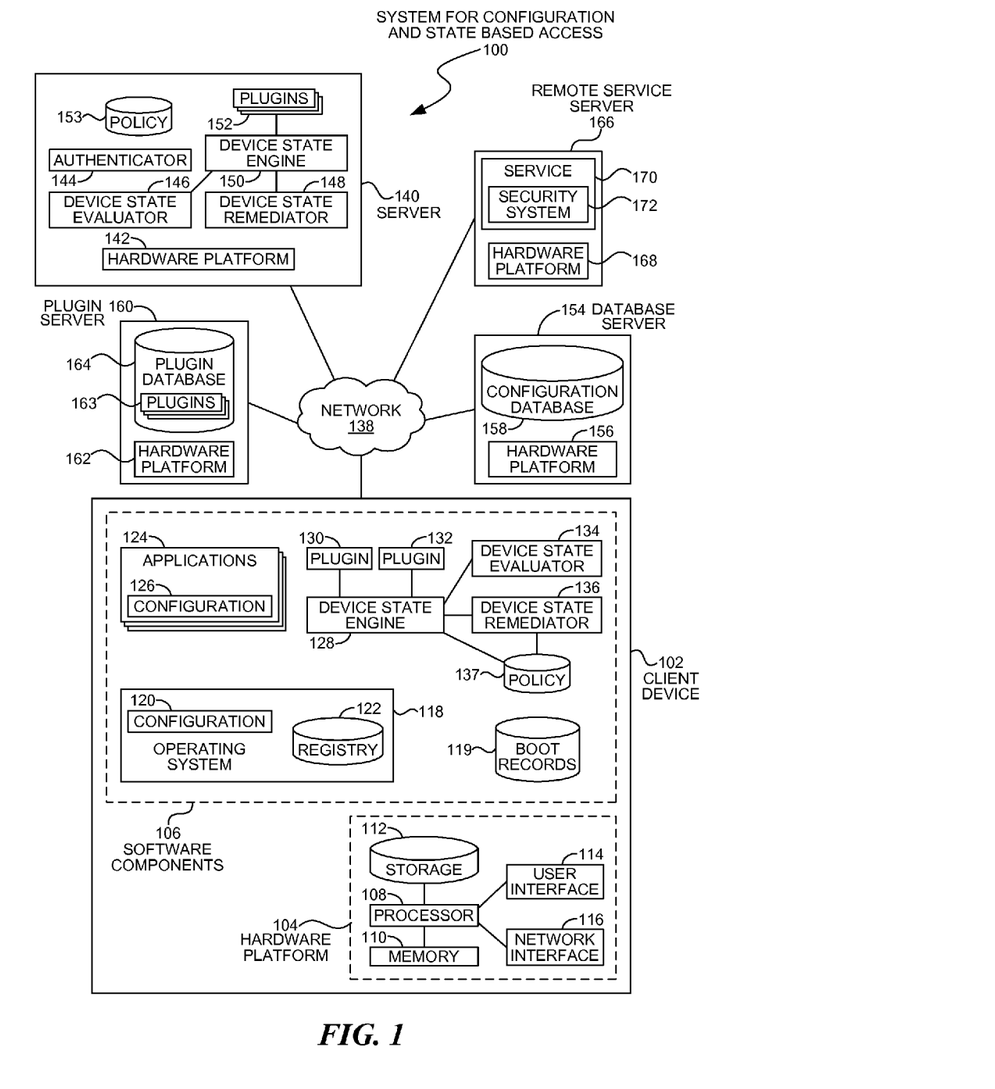
FIG. 1 is a diagram of an embodiment showing a network environment for configuration and state based access.

FIG. 1 is a diagram of an embodiment 100, showing an environment in which a client device may be tested for configuration and state, which may be used to access a resource. Embodiment 100 is a simplified example of a network environment in which a client device may interact with a server and a network resource.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a network environment in which a client device 102 may interact with a server 140 to generate a token that may be accepted by a resource, such as a remote service server 166. The token may attest that the client device 102 may be compliant with various state and configuration parameters that the resource desires prior to accessing the resource.

In one use model, a client device 102 may attempt to access a corporate network. After making initial contact with the corporate gateway, the client device 102 may receive a claim policy that includes various state objects and their desired values. The claim may include, for example, that antivirus and antimalware components are installed and properly operational, and that the client device has a proper set of encryption components installed and operational. In some similar embodiments, the client device 102 may receive the claim prior to making contact with the corporate gateway and supply the claim as part of a request for access.

In the use model, the claim policy may be received and processed by the client device. The client device may search for the requested state objects within the system, then send the state object values and some authentication information to a server for validation. The server may validate the data using the authentication information, then issue a token. The token may pass to the client device, then to the network gateway, which may grant access to the network by virtue of the token.

In a second use model, the client device 102 may attempt to access an application that is licensed for a specific location. In such a situation, the application may operate only when a claim that includes a geographic location for the requesting device is within a specific area. For example, the application may be licensed only in the United States, but not licensed for other locations. In such a use model, the application may transmit a request for the geographic location of the requesting device. The requesting device may produce geographic information that may be verified by a server, which may produce a trusted token and thereby gain access to the application for the requesting device.

Many different use models may be enabled by the components described below. In each use model, information about the device may be gathered, verified, and transmitted to a requesting resource.

In some embodiments, the components may be extensible. The extensibility may allow new state objects to be evaluated for different situations. In one such embodiment, a device state engine may have various plugin components or modules that include executable code that communicates with a specific state object on the device.

For example, a user may install a new peripheral device on their computer. As part of the installation process, a plugin for the device state engine may be installed so that an application that uses the newly installed peripheral device may determine that the peripheral device is present and properly configured. The state object relating to the peripheral device may be queried in response to a claim from the application.

The extensibility of the device state engine may allow new uses of the system by adding executable code that may gather any type of information about the device imaginable.

The system may operate in several different manners. In one embodiment, the client device may execute code that performs some or all of the queries for various state objects. In another embodiment, a server or other device may perform queries against the client device or against a database that contains information about the client device. In some such embodiments, a query for state objects for a particular device may be performed without having to communicate with or query the device itself.

The system may have an architecture where a server verifies information provided from the client device. In such systems, the client device may provide some information that may be used to authenticate the client device and verify that the information being received from the client device is trustworthy.

In one such embodiment, the client device may gather information such as signatures of executing operating system or applications, which may be compared to a set of intended signatures. When the signatures match, the executing software may be trustworthy, but when the signatures do not match, that may be evidence that malware may be present on the device.

In such an embodiment, the client device may gather a signature of the boot record used to start up the software on the device, which may be compared to a signature of an operating system or other executable code that is currently running. When the two signatures match, the client device may be assumed to be trustworthy as malware may not have infected the operating system. Other embodiments may have other mechanisms to ensure that the data provided from the client device are valid and trustworthy.

The server may verify the information provided by the client device in order to reflect the level trustworthiness of the information. The server, rather than the client, verifies the information leading to a higher level of trust in the results.

Some embodiments may include a remediator which may attempt to make changes to the client device when a claim is being processed. The remediator may receive a desired state object value and may attempt to change the state object to match the desired state object.

In a simple example, a remediator may receive a state object concerning a firewall with a desired state object value of "on". When evaluating the firewall to collect the state object value, the remediator may determine that the current state object value is "off". The remediator may then attempt to configure the firewall into an "on" state, then re-test the firewall. If the firewall is re-tested as "on", the current state of "on" may be used in the claim.

The client device 102 may have a set of hardware components 104 and software components 106. The client device 102 may represent any type of device that may communicate with another device over a network 138.

The hardware components 104 may represent a typical architecture of a computing device, such as a desktop or server computer. In some embodiments, the client device 102 may be a personal computer, game console, network appliance, network infrastructure device, interactive kiosk, or other device. The client device 102 may also be a portable device, such as a laptop computer, netbook computer, tablet computer, personal digital assistant, mobile telephone, or other mobile device.

The hardware components 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware components 104 may also include one or more user interface devices 114 and network interfaces 116. The user interface devices 114 may include monitors, displays, keyboards, pointing devices, touchscreens, and any other type of user interface device. The network interfaces 116 may include hardwired and wireless interfaces through which the device 102 may communicate with other devices.

In some embodiments, some of the hardware components may be virtualized as a software simulation. In such embodiments, the virtualized hardware components may execute on a physical set of hardware components 104.

The software components 106 may include an operating system 118 on which various applications may execute.

The operating system 118 may contain various configuration items 120 and a registry 122, which may indicate the current configuration or state of the operating system 118 and the client device 102. These items may act as various state objects that may be interrogated or observed when processing a claim.

A set of boot records 119 may be queried as part of a mechanism to determine if the software on the client device 102 has been modified, tampered with, or may be the victim of malware. A signature, such as a hash function of all or a portion of the operating system or other software operating on the client device 102 may be derived from the boot records 119 and compared to a similar hash function of the same software as being executed on the client device 102. When the signatures match, the software being executed may be assumed to be authentic and the data provided by the software may then be trusted.

When comparing signatures, some embodiments may attempt to compare signatures of executing software with signatures of known malware. When a match is found with that of known malware, the embodiment may declare the device as untrusted for any information.

In some embodiments, the state objects may include information relating to various applications 124 that may operate on the client device 102. The applications 124 may have various configuration items 126 that may serve as state objects in a claim, as well as the registry 122. In some cases, the configuration items 126 may be configuration settings or options, while in other cases, the configuration items 126 may include data being collected by or processed by the application.

A device state engine 128 may gather state object information from the client device 102. The device state engine 128 may query, interrogate, monitor, observe, or otherwise detect values of various state objects that may be defined in a claim. The device state engine 128 may be an application that executes on the client device 102, receives one or more state objects to query, determines state object values for the requested state objects, and returns the state object values to a server 140 for further processing.

The device state engine 128 may also gather any type of authentication information that may be used to verify or authenticate the data being passed to the server 140. In some embodiments, the device state engine 128 may transmit a signature of the executing device state engine 128 as well as a signature of the device state engine software found in the boot records 119 or other location where the executable code may be stored. By comparing the signatures of the device state engine 128, a server may be able to verify and trust that the information gathered by the device state engine 128.

The device state engine 128 may have one or more plug in modules 130 and 132. The plug in modules may be additional software components that may expand the capability of the device state engine 128 to query a larger range of state objects. In some embodiments, the plug in modules may be written by and supplied by third parties, such as manufacturers of various applications 124, peripheral devices, or other components that may operate on or in conjunction with the client device 102.

The client device 102 may have a device state evaluator 134 that may evaluate claims. The device state evaluator 134 may receive a claim policy from a remote service, the server 140, or other source that includes various requested conditions. In many cases, the claim policy may define a set of conditions that may be met prior to accessing a resource. In some cases, the claim policy may include a 'grace period' where certain non-compliant values may be permitted for a specific duration.

The device state evaluator 134 may parse a claim policy to identify the state objects that are to be evaluated by the device state engine 128. In some embodiments, the device state evaluator function may be performed by another device, such as the server 140.

In some cases, a device state evaluator 134 may collect information and evaluate the information to include a statement in a claim. For example, a device state evaluator may evaluate a device's firewall to determine whether the firewall is correctly operating. The claim may include a statement such as "FirewallEnabled=true" that represents a summary statement used in a claim.

In some cases, a device state evaluator 134 may collect information that may be passed along with the claim. For example, a device state evaluator may determine a physical location for the device and may pass latitude and longitude values within the claim.

A device state remediator 136 may compare a desired state object value with a current state object value and may attempt to change the state object to align with the desired state object value. In some embodiments, the device state remediator 136 may utilize code in the plugin modules to attempt to change the state object to meet the desired value.

In many embodiments, a set of policies 137 may be defined that describe how the device state components may operate. The policies 137 may define which state objects are to be evaluated in which order, which state objects may or may not be changed by the remediator, and other operational characteristics. The policies 137 may include a claim policy that may be received from the server 140, as well as other policies that configure the components of the client device 102. For example, another policy may define which server 140 to use and how to connect to the server 140.

In some embodiments, the device state engine 128 may continually or periodically monitor the state of the client device 102 and may determine if the device state changes. In such embodiments, the client device 102 may be configured to take remedial action, create an alert for the remote service server 166, or perform other operations. In some embodiments, the device state engine 128 may revoke or amend a claim that may be used by the remote service server 166 to deny or restrict access.

The client device 102 may communicate to various other devices over a network 138. The network 138 may be any form of a communications network, such as wired or wireless, and may be a local area network, wide area network, the Internet, or any other network.

A server 140 may validate any information collected from the client device 102 as well as perform additional functions in some embodiments. The server 140 may operate on a hardware platform 142, which may be functionally similar to the hardware platform 104 of the client device. In some cases, the functions of the server 140 may operate in a cloud computing or virtual environment where the hardware platform is virtualized. Server 140 may include plugins 152 and policy 153.

The server 140 may have an authenticator 144 that may receive authentication information from the client device 102 and validate or invalidate the data received from the client device 102. In some cases, the authenticator 144 may receive signatures of code that may be executing on the client device 102 and compare those signatures to signatures retrieved from boot records from the client device. In some embodiments, the authenticator 144 may compare signatures against a database of approved signatures, where the database may be stored on the server 140 or some other location.

In some embodiments, the server 140 may include a device state engine 150. The device state engine 150 may operate to collect data about the client device 102. In some situations, the device state engine 150 may query or observe the client device 102 to retrieve a state object value.

In some situations, the device state engine 150 may query a third device, such as a database server 154 to determine information about a state object relating to the client device 102. The database server 154 may operate on a hardware platform 156 and may maintain a configuration database 158 that may include information relating to the client device 102. In some cases, the server 140 may collect state object information about the client device 102 by querying the configuration database 158. In such cases, the client device 102 may not be queried or have any involvement with determining a state object value.

In an example of a database server 154, the client device 102 may be connected to a network that is managed as a domain or other group of managed devices. Within the domain, a configuration database 158 may maintain information about the client device 102, such as its device type, authorized users, or many other configuration data objects. Any of the data objects may be referenced as a state object in a claim definition and may be queried by a device state engine 150 on the server 140.

The server 140 may include a device state evaluator 146 which may parse a claim policy to identify the state objects to be collected. In such an embodiment, the server 140 may perform some or all of the claim processing, where in other embodiments, such processing may be performed by a client device 102.

Figure 2:
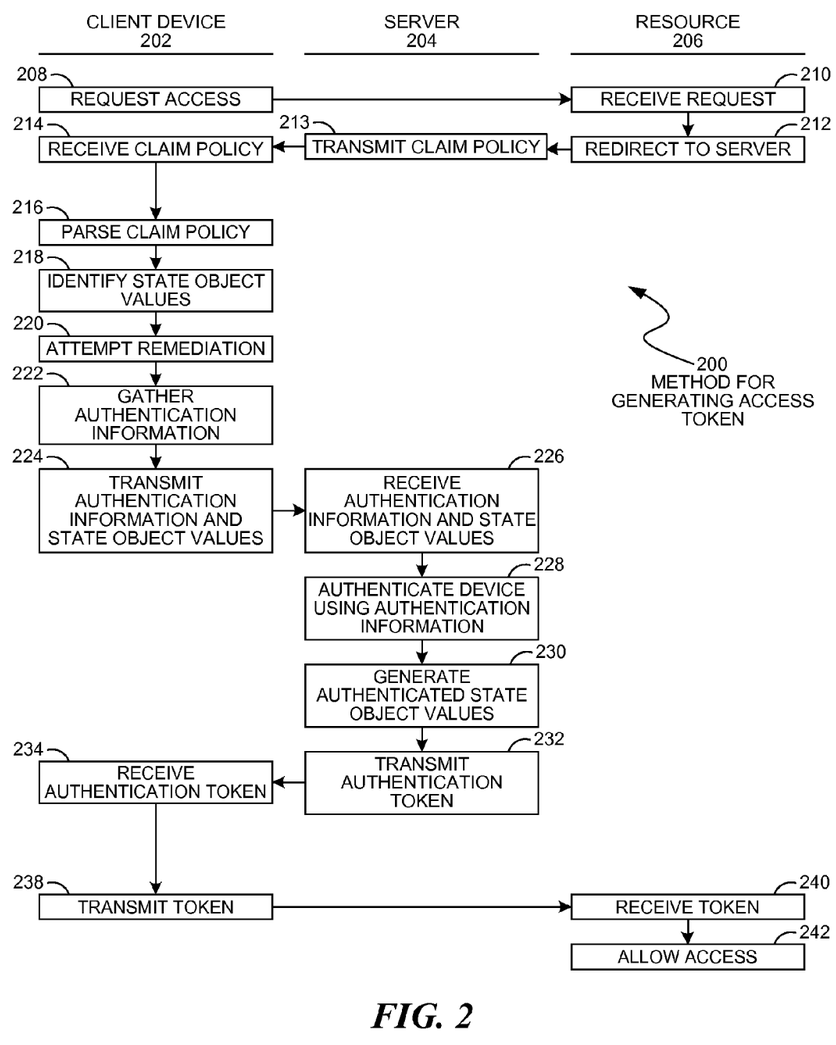
FIG. 2 is a timeline illustration of an embodiment showing a first method for generating an access token.
Figure 3:
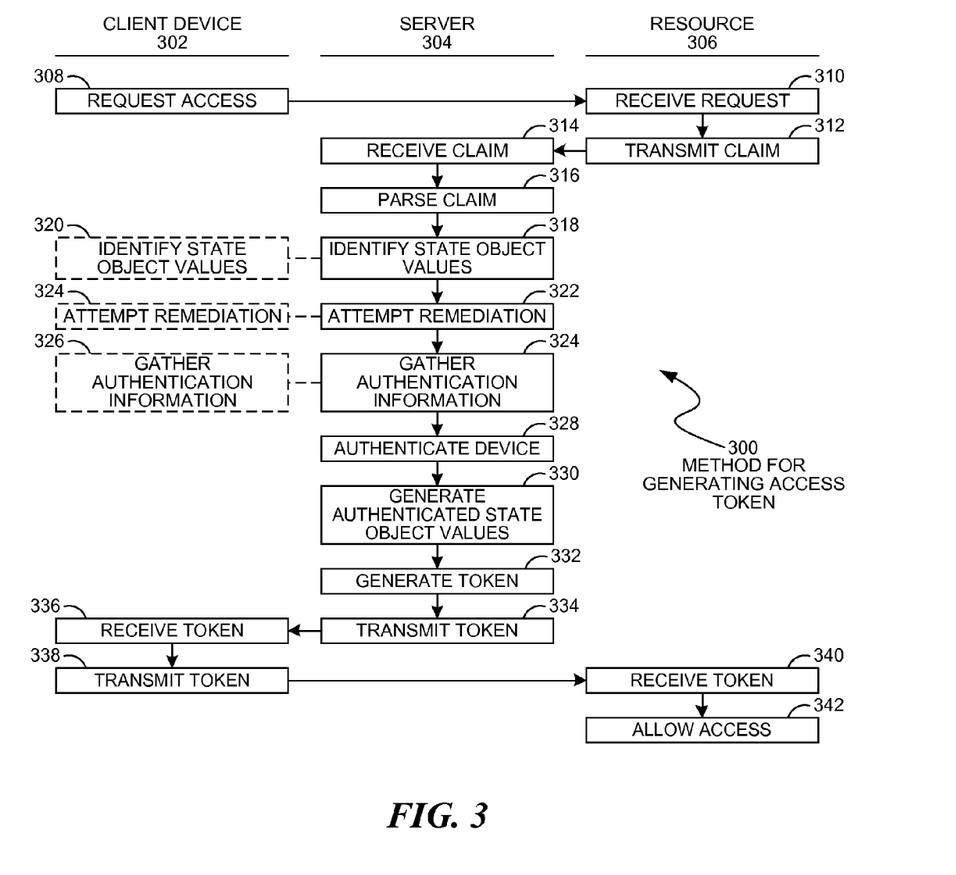
FIG. 3 is a timeline illustration of an embodiment showing a second method for generating an access token.

In some embodiments, as will be described later in this specification in embodiments 200 and 300, some processes may be performed by the client device 102 and some by the server 140. When many of the device state processes are performed by the client device 102, much or all of the claims processing and data collection may be performed by the client device 102 and the server 140 may perform authentication. In other embodiments, some or all of the claims processing and data collection may be performed by the server 140 with minimal involvement, if any, by the client device 102.

Embodiments where a minimal involvement by the client device 102 may be useful where the client device 102 may have limited network connectivity or limited processing power. For example, when the client device 102 is a cellular telephone, game console, or other device, the client device 102 may not have enough capability to execute some of the device state components.

The server 140 may have a device state remediator 148 which may attempt to correct a state object when the state object does not match a desired state object as defined in a claim.

The device state components may operate in conjunction with a remote service server 166 that may have a security system 172 that receives tokens that satisfy one or more claims. The remote service server 166 may operate on a hardware platform 168 and may have a service 170 or other requested resource. The security system 172 may permit or deny access to the service 170 based on a token that includes a requested claim.

In some embodiments, a claim policy may be transmitted from the security system 172 to the client device 102 when the client device requests access to the service 170. The claim policy may define a minimum configuration of a device that may access the service 170. Once processed, the evaluation of the claim may be verified by the server 140 which will produce a token that may be accepted by the security system 172.

The example of a service 170 may reflect any requested resource. The resource may be a database, device, network, server, application, or any other resource that may be accessed from the client device 102. In some embodiments, the resource may be located on the client device 102, the server 140, or some other device, such as the remote service server 166.

In some embodiments, a plugin server 160 may be accessed by either the device state engine 128 on the client device 102 or the device state engine 150 on the server 140. The plugin server 160 may have a hardware platform 162 and a plugin database 164 that may contain various plugins 163. The device state engines may query the plugin database 164 to identify, download, and install a plugin when a state object is requested and the device state engine does not have a mechanism for querying the state object. The plugin server 160 may also be queried to identify, download, and install a plugin when changes are made to the client device 102, such as installing a new application or peripheral device. In some embodiments, the plugin server 160 may be a separate server or part of the server 140.

FIG. 2 is a timeline illustration of an embodiment 200 showing a method for generating an access token. Embodiment 200 is a simplified example of a method that may be performed by client device 202, a server 204, and a resource 206. The operations of the client device 202 are illustrated in the left hand column, the server 204 in the center column, and the resource 206 in the right hand column. The operations of the client device 202, server 204, and resource 206 may correspond with those of the client device 102, server 140, and remote service server 166 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method where much of the operations for parsing a claim policy, determining device state, and generating a token are performed by the client device 202. In embodiment 300 presented later in this specification, another embodiment shows a similar set of steps but where many of the operations may be performed by the server rather than the client device.

In block 208, the client device 202 may request access to a resource 206. The request may be received in block 210 and in response, the resource 206 may redirect the request to a server 204 that may be trusted by the resource 206. The server 204 may transmit the claim policy to the client device 202. The claim policy may define the configuration that may be expected by the resource 206 to gain access to the resource.

In some embodiments, the claim policy may not be transmitted from the resource 206 to the client device 202. In some embodiments, a request for access by the client device 202 may be redirected from a resource to a server in block 212 from which the claim process may begin.

In some embodiments, the claim policy may be retrieved prior to requesting access to a resource. In such an embodiment, a client device may gather information from which a claim may be created, receive a token from a server, and pass the token to the resource in an initial request for access to the resource.

Figure 4:
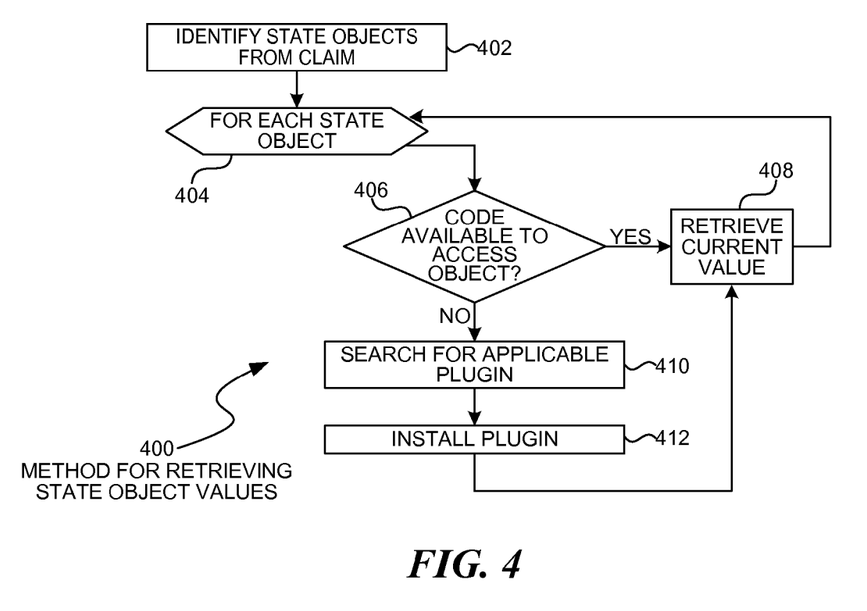
FIG. 4 is a flowchart of an embodiment showing a method for retrieving state object values.

The server 204 may transmit the claim policy in block 213. The client device 202 may receive the claim policy in block 214, parse the claim policy in block 216 to identify any state objects within the claim. In block 218, the state object values may be identified. The state object values may be determined by a device state engine, such as the device state engine 128 in embodiment 100. An example of a method for determining state object values may be illustrated in embodiment 400 presented later in this specification.

Figure 5:
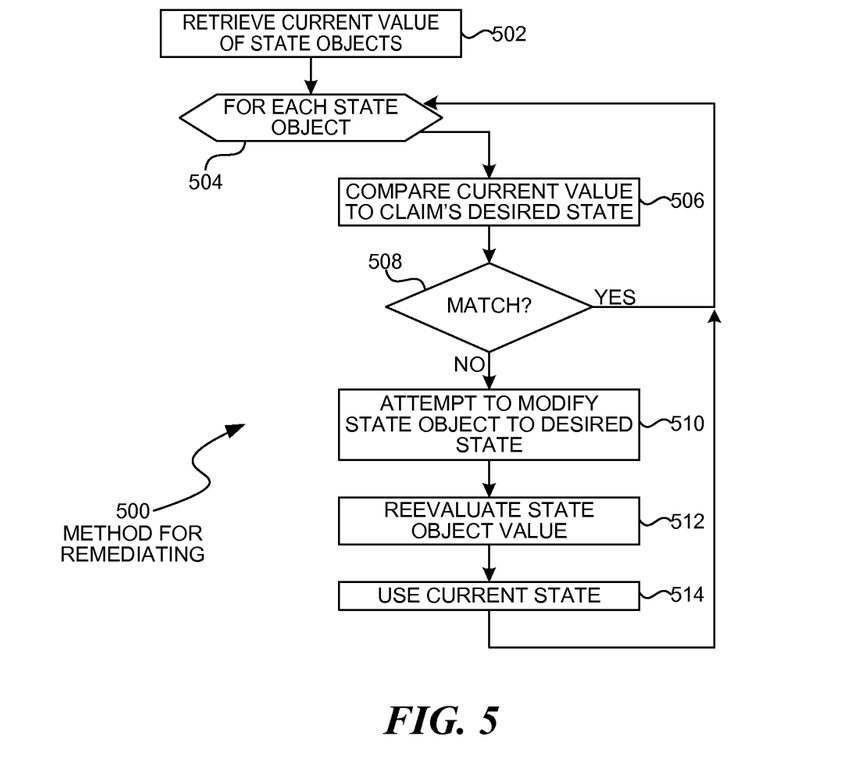
FIG. 5 is a flowchart of an embodiment showing a method for remediating.

If there are state objects whose values are different from what the claim policy defines, an attempt at remediation may be performed in block 220. In some embodiments, a re-evaluation of the device state may be performed after the remediation attempt. An example of a method for remediation may be illustrated in embodiment 500 presented later in this specification.

Authentication information may be gathered in block 222. The authentication information may be any type of information that the server 204 may use to assess the validity of data collected by the client device 202. In some embodiments, the various plugin modules in a device state engine may include components that gather specific authentication information from the client device.

The authentication information and state object values may be transmitted from the client device 202 to the server 204 in block 224 and received in block 226. In some embodiments, the client device 202 may perform some or all of the evaluation of the state objects prior to transmitting to the server 204 in block 224.

The server 204 may authenticate the device using the authentication information in block 228 and may generate authenticated state object values in block 230. The authenticated state object values from block 230 may not be different from the received state object values, but may be considered as authenticated after the authentication is successful in block 228.

The server 204 may generate an authentication token in block 232. The authentication token may be any type of message, data, certificate, token, or other information that may be trusted by the resource 206. In some cases, the token may be created using a private key and the token may be verified by the resource 206 using a public key known to be supplied by the server 204.

The client device 202 may receive the token in block 234 and may transmit the token in block 238 to the resource 206. The resource 206 may receive the token in block 240 and may allow access based on the token in block 242.

FIG. 3 is a timeline illustration of an embodiment 300 showing a second method for generating an access token. Embodiment 300 is a simplified example of a method that may be performed by client device 302, a server 304, and a resource 306. The operations of the client device 302 are illustrated in the left hand column, the server 304 in the center column, and the resource 306 in the right hand column. The operations of the client device 302, server 304, and resource 306 may correspond with those of the client device 102, server 140, and remote service server 166 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a second method where much of the operations for parsing a claim, determining device state, and generating a token are performed by the server 304. Embodiment 300 differs from embodiment 200 in that many of the operations performed by the client device 202 in embodiment 200 may be performed by the server 304 in embodiment 300.

The client device 302 may request access to a resource 306 in block 308, and the request may be received in block 310. In response, the resource 306 may transmit a claim policy in block 312 to the server 304. In some embodiments, the claim policy may be transmitted to the client device 302 which may forward the claim policy to the server 304. In some embodiments, a request from a client device 302 may cause the resource 306 to redirect the request to a server 304 to obtain a token.

The server 304 may receive the claim policy in block 314, parse the claim policy in block 316 to identify state objects, then attempt to find state object values in block 318. In some cases, the server 304 may be able to obtain some or all of the state object values without contacting the client device 302. In some cases, the server 304 may interact with the client device 302 in block 320 to obtain the state object values. In some embodiments, the client device 302 may or may not evaluate the various state object values. In a passive operation of the client device 302, information may be gathered by the server 304 without having the client device 302 receive or evaluate the claim policy.

After receiving the state object values, the server 304 may evaluate the current state object values against the claims and, if there are differences, may attempt remediation in block 322. In some cases, the server 304 may interact with the client device 302 to attempt remediation in block 324.

The server 304 may gather authentication information in block 324. In some embodiments, some or all of the authentication information may be gathered with the assistance of the client device 302 in block 326.

The server 304 may authenticate the device using the authentication information in block 328 and may generate a set of authenticated state object values in block 330. A token may be generated in block 332 that may include information relating to the claim in block 332.

The token may be transmitted in block 334 to the client device 302, which may receive the token in block 336. The token may be transmitted in block 338 to the resource 306, which may receive the token in block 340 and allow access in block 342.

Embodiments 200 and 300 represent two different embodiments where either the client device or the server may perform certain tasks. Other embodiments may have portions of the tasks performed by the client device and other portions performed by the server.

FIG. 4 is a flowchart illustration of an embodiment 400 showing a method for retrieving state object values. Embodiment 400 is an example of a process that may be performed by one of the device state engines 128 or 150 to gather a state object value.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates an example of a system that may use plugins to attempt to find a state object value. The plugins may be one mechanism by which a device state engine may be extended to include additional functionality. The plugins may be supplied by various manufacturers and used to extend the capabilities of the device state engines and other device state components to address new applications and capabilities that may be added to the client devices.

In block 402, state objects may be identified from the claim. The operations of block 402 may be that of blocks 216 or 316 of embodiments 200 and 300, respectively.

For each state object in block 404, an assessment may be made in block 406 to determine if the device state engine has the capability to access the requested state object in block 406. If the device state engine has the capability in block 406, the current value of the state object may be retrieved in block 408.

If the device state engine does not have the capability in block 406, a search for an applicable plugin may be made in block 410. In some cases, the search may be a local search, where the server or client device may search for plugins that are already downloaded. In other cases, the search of block 410 may be to a plugin database that may be located remotely, such as on the Internet, and from which an applicable plugin may be downloaded.

After identifying the plugin in block 410, the plugin may be installed in block 412 and used in block 408 to retrieve the current value for the state object.

FIG. 5 is a flowchart illustration of an embodiment 500 showing a method for remediating when a current state object value does not match a requested state object value in a claim. Embodiment 500 is an example of a process that may be performed by one of the device state remediators 136 or 148 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 502, the current value of state objects may be retrieved. Block 502 may correspond with blocks 218 or 318 of embodiments 200 or 300, respectively.

For each state object in block 504, the current value may be compared to the desired value according to the claims policy in block 506. If there is a match in block 506, the state object appears to be acceptable. In some cases, the claims policy may have a simple condition, such as "firewall is enabled". In other cases, the claims policy may have a more complex condition, such as "firewall is enabled, or has been disabled for less than 8 hours". Each embodiment may have different complexity of conditions and different mechanisms for expressing those conditions.

If there is not a match in block 508, an attempt to modify the state object to the desired state may be made in block 510. In some cases, the state object may be modified by changing some underlying application, hardware, software setting, operating system configuration, registry key, or other item. In some cases, such a change may or may not be possible. In some cases where the change may be possible, the change may not be successful.

After attempting the change, the state object value may be reevaluated in block 512. The current state after the reevaluation may be used in block 514.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system for processing a request from a device to access a resource, the system comprising:
    a device state engine that is configured to:
       parse a claim policy to identify one or more state objects relevant to accessing said resource, said claim policy defining a minimum device configuration that is expected for components installed at said device to permit access to said resource, said one or more state objects corresponding to said components installed at said device, said claim policy further defining an order in which said one or more state objects are to be processed to determine if access to said resource is permitted, the defined order including processing at least one security related state object prior to processing at least one other state object; and
       determine one or more actual state object values for said one or more state objects from a device configuration of said device, determining said one or more actual state object values including gathering boot record information and gathering executing code identifiers for said device, the executing code identifiers corresponding to executing code executing on said device; and
    an evaluator that is configured to:
       access said claim policy;
       receive an indication that the integrity of said device configuration has been verified by an authenticator;
       subsequent and in response to receiving said indication, evaluate said claim policy to determine if said client device is to be granted access to said resource or if said device is to be denied access to said resource by determining if said device satisfies said minimum device configuration, including determining that said executing code is legitimate based on said boot record information and said executing code identifiers, evaluating said claim policy including processing said one or more actual state object values, including values for said boot record information and said executing code identifiers, from said device configuration, in accordance with said order for said one or more state objects, said processing including processing an actual state object value for said at least one security related state object prior to processing an actual state object value for said at least one other state object; and
       create a token based on the results of evaluating said claim policy, said token indicating whether said device is granted or denied access to said resource.

2. The system of claim 1, said device state engine operating on server device, the server device different from said device.

3. The system of claim 2, said state object being located on said device.

4. The system of claim 2, said state object being located in a database separate from said device.

5. The system of claim 1, said device state engine operating on said device.

6. The system of claim 5, said evaluator operating on said device.

7. The system of claim 6, further comprising an authenticator that is configured to:
    access authentication information for authenticating said device;
    verify the integrity of said device configuration by authenticating said one or more actual state object values using said authentication information; and
    send said indication to said evaluator.

8. The system of claim 5, said device state engine comprising a plugin architecture that is configured to:
    receive a state engine plugin, said state engine plugin comprising executable code for detecting a second state object; and
    receive a request for said second state object and calls said state engine plugin and receives said second state object from said state engine plugin.

9. The system of claim 1, wherein said evaluator that is configured to evaluate said claim policy to determine if said device is to be granted access to said resource or if said device is to be denied access to said resource comprises said evaluator that is configured to:
    determine that said device does not satisfy said minimum device configuration due to one or more non-compliant values; and
    permit said device access to said resource for a grace period of a specified duration defined in said claim policy based on said one or more non-compliant values.

10. The system of claim 1 further comprising a remediator that is configured to:
    receive a desired state for said state object;
    attempt to change said state object on said device to align with said desired state; and
    cause re-evaluation of said claim policy subsequent to attempting to change said state object on said device to said desired state to determine if said device can now be granted access to said resource or if said device is to continue to be denied access to said resource.

11. The system of claim 10, said remediator operating on said device, said device state engine operating on said device, said device state engine that is further configured to:
    receive said claim policy; and
    parse said claim policy to identify said desired state.

12. The system of claim 11, said claim policy being transmitted to said device in response to a request for access by said device to a resource.

13. At a computer system, a method performed on at least one processor for processing a request to access to a resource, said method comprising:
    receiving the request from a device to access said resource;
    parsing a claim policy to identify one or more state objects relevant to accessing said resource, said claim policy defining a minimum device configuration that is expected for components installed at said device to permit access to said resource, said claim policy comprising said one or more state objects corresponding to said components installed at said device, said claim policy further defining an order in which said one or more state objects are to be processed to determine if access to said resource is permitted, the defined order including processing at least one security related state object prior to processing at least one other state object;

determining one or more actual state object values for said one or more state objects from a device configuration of said device, determining said one or more actual state object values including gathering boot record information and gathering executing code identifiers for said device, the executing code identifiers corresponding to executing code executing on said device;

collecting authentication information for said device;

verifying the integrity of said device configuration by authenticating said one or more actual state object values using said authentication information;

subsequent to and in response to verifying the integrity of said device, evaluating said claim policy to determine if said device is to be granted access to said resource or if said device is to be denied access to said resource by determining if said device satisfies said minimum device configuration, including determining that said executing code is legitimate based on said boot record information and said executing code identifiers, evaluating said claim policy including processing said one or more actual state object values from said device configuration, including values for said boot record information and said executing code identifiers, in accordance with said order for said one or more state objects, including processing an actual state object value for said at least one security related state object prior to processing an actual state object value for said at least one other state object, the at least one other state object including a non-security related configuration setting of said device;

creating a token based on the results of evaluating said claim policy, said token indicating whether said device is granted or denied access to said resource.

14. The method of claim 13, wherein evaluating said claim policy comprises determining that said device is to be denied access to said resource; and wherein creating said token comprises creating said token that indicates access to said resource is to be denied.

15. The method of claim 13, wherein evaluating said claim policy comprises determining that said device is to be granted access to said resource; and wherein creating said token comprises creating said token that indicates access to said resource is to be granted.

16. The method of claim 13, wherein the claim policy further includes one or more expected state object values for the one or more state objects, and wherein evaluating said claim policy comprises:

determining that an actual state object value and an expected state object value for a state object do not match;

remediating said state object by attempting to change said actual state object value on said device to align with said expected state object value; and re-evaluating said claim policy subsequent to attempting to change said actual state object value on said device to align with said expected state object value to determine if said device can now be granted access to said resource or if said device is to continue to be denied access to said resource.

17. The method of claim 13, wherein determining if said device is to be granted access to said resource or if said device is to be denied access to said resource comprises:

determining that said device does not satisfy said minimum device configuration due to one or more non-compliant values; and permitting said device access to said resource for a grace period of a specified duration defined in said claim policy based on said one or more non-compliant values.

18. The method of claim 13, wherein authenticating said one or more actual state object values comprises determining that said device is executing legitimate applications so as to minimize the chance of malware impersonating the device.

19. A computer program product for use at a computer system, said computer program product for implementing a method for processing a request to access to a resource, said computer program product comprising one or more computer storage media devices having stored thereon computer-executable instructions that, when executed at a processor, cause the computer system to perform the method, including the following:

receive a request from a device to access said resource;

parse a claim policy to identify one or more state objects relevant to accessing said resource, said claim policy defining a minimum device configuration that is expected for components installed at said device to permit access to said resource, said claim policy comprising said one or more state objects corresponding to said components installed at said device, said claim policy further defining an order in which said one or more state objects are to be processed to determine if access to said resource is permitted, the defined order including processing at least one security related state object prior to processing at least one other state object;

determine one or more actual state object values for said one or more state objects from a device configuration of said device, determining said one or more actual state object values including gathering boot record information and gathering executing code identifiers for said device, the executing code identifiers corresponding to executing code executing on said device;

collect authentication information for said device;

verify the integrity of said device configuration by authenticating said one or more actual state object values using said authentication information;

subsequent to and in response to verifying the integrity of said device, evaluate said claim policy to determine if said device is to be granted access to said resource or if said device is to be denied access to said resource by determining if said device satisfies said minimum device configuration, including determining that said executing code is legitimate based on said boot record information and said executing code identifiers, evaluating said claim policy including processing said one or more actual state object values, including values for said boot record information and said executing code identifiers, from said device configuration in accordance with said order for said one or more state objects, including processing an actual state object value for said at least one security related state object prior to processing an actual state object value for said at least one other state object, the at least one other state object including a non-security related configuration setting of said device;

create a token based on the results of evaluating said claim policy, said token indicating whether said device is granted or denied access to said resource.

20. The computer program product of claim 19, wherein the claim policy further includes one or more expected state object values for said one or more state objects, and wherein computer-executable instructions that, when executed, cause the computer system to evaluate said claim policy comprise computer-executable that, when executed, cause the computer system to:
- determine that an actual state object value and an expected state object value for a state object do not match; and
- remediate said state object by attempting to change said actual state object value on said device to align with said expected state object value
- re-evaluate said claim policy subsequent to changing said actual state object value on said device to align with said expected state object value to determine that said device does not satisfy said minimum device configuration due to one or more non-compliant values; and
- permit said device access to said resource for a grace period of a specified duration defined in said claim policy based on said one or more non-compliant values.

* * * * *